Figure 1:
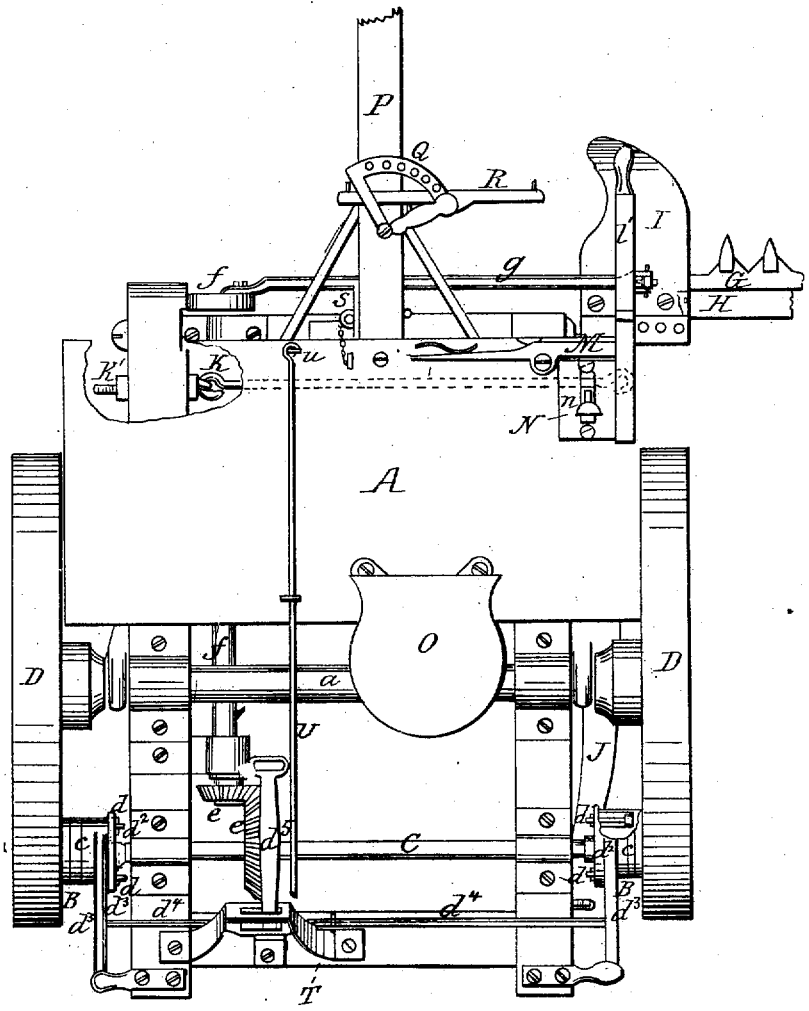

2 Sheets—Sheet 1.

E. F. & J. HERRINGTON.

Mower.

No. 2,639.

Reissued June 4, 1867.

Witnesses.
Norman B. Smith.
Charles Horn.

E. E. Moore. assignee
by his Attorney
A. M. Smith

N. PETERS. Photo-Lithographer, Washington, D. C.

2 Sheets—Sheet 2.
E. F. & J. HERRINGTON.
Mower.
No. 2,639.
Reissued June 4, 1867.
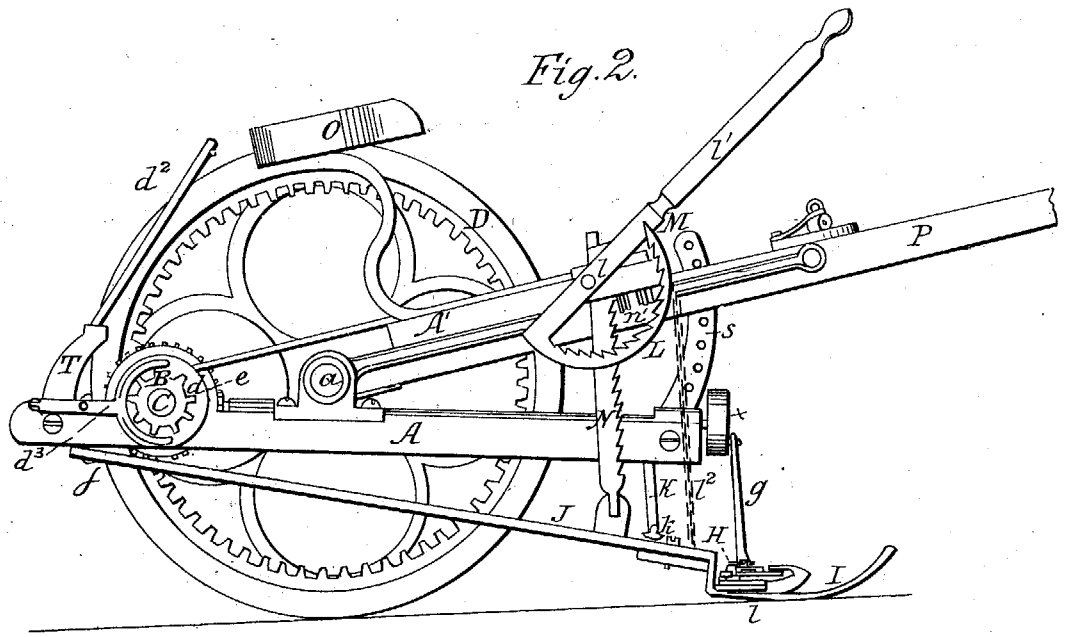
N. PETERS, Photo-Lithographer, Washington, D. C.

UNITED STATES PATENT OFFICE.

CHARLES C. MORE, OF PITTSTOWN, NEW YORK, ASSIGNEE, BY MESNE ASSIGNMENTS, OF E. F. AND J. HERRINGTON.

IMPROVEMENT IN MOWING-MACHINES.

Specification forming part of Letters Patent No. 31,973, dated April 9, 1861; Reissue No. 2,639, dated June 4, 1867.

*To all whom it may concern:*

Be it known that EPHRAIM F. HERRINGTON and JOSIAH HERRINGTON, late of West Hoosick, in the county of Rensselaer and State of New York, invented certain new and useful Improvements in Mowing-Machines, of which the following is a full, clear, and exact description, reference being had to the accompanying drawings, making part of this specification, in which—

Figure 1 is a plan of a mowing-machine embodying their improvements. Fig. 2 is a side elevation of the same with one wheel removed.

Similar letters of reference indicate corresponding parts in both figures.

The invention relates to the manner of supporting the laterally-projecting hinged cutting apparatus in a two-wheel forward-cut machine; to the means for compensating for its backward deflection in use; to the means for raising and lowering the cutting apparatus, whereby either the heel or the point of said cutting apparatus, or both, may be raised by the driver on the machine by the operation of a single lever; to the arrangement of the driving mechanism in connection with the means for throwing into and out of gear; and to the construction of the joint between the cutter-bar and pitman or connecting-rod, as hereinafter explained.

To enable others skilled in the art to make and use said invention, I will proceed to describe its construction and operation.

A is the main frame of the machine, and A′ the draft-frame, both of which are secured to the axle *a* (the latter by a hinged attachment) in such manner as to be adjustable relatively to each other at any desired angle. D D are two driving-wheels, journaled upon the axle *a*, and provided with cog-gearing, with pinions B B journaled loosely upon the main driving-shaft C, but imparting motion thereto when the machine is in gear, and moving forward through the medium of clutches constructed as follows: *c c* are collars, secured to the shaft C, and constructed with sockets for the reception of pins *d d*, which engage with ratchet-teeth on the inner faces of the pinions B. The said pins are pressed outward toward the pinions by means of spiral springs bearing upon shoulders and the pin *d* and collar *c*, as clearly shown in the sectional view in Fig. 1. The heads of the pins are held in disks or yokes $d^2$, sliding loosely upon the shaft, and adapted to withdraw the pins simultaneously from both pinions, when it is desired to throw the machine out of gear, by means of crotch-levers $d^3$, connecting-rods $d^4$, and a wedge, $d^5$, operating on the connecting-rods, to draw the crotched end of the levers $d^3$ toward the center of the machine. T is a slotted standard, projecting upward from the main frame to support the wedge $d^5$ and guide it in a proper path. Gearing *e e*, shaft *f*, crank-wheel *f′*, and connecting-rod *g* transmit motion from the shaft C to the cutter-bar G. The rod *g* is connected with the cutter-bar by a double horizontal hinge-joint, which effectually prevents any horizontal play between them, but permits the connecting-rod to work at any angle without binding. The finger-bar H is secured to a shoe, I, the construction of which is clearly shown in Fig. 2. *i* represents a wedge-shaped plate interposed between the finger-bar and shoe, and adapted, by being reversed in position, to vary the angle of presentation of the former. J is a metallic bar, rigidly secured to or forming a rear brace extension of the shoe, extending backward, and hinged at *j* to the rear end of the main frame. K is a brace-rod, hinged at *k* to the bar J, and extending laterally to the opposite side of the main frame, to which it is attached adjustably by a screw-bolt and nuts, as shown at *k′* in Fig. 1. L is a segment, pivoted at *l* to the draft-frame, provided with a hand-lever, $l^1$, and adapted to raise the finger-bar at either or both ends by means of a chain or cord, $l^2$, attached to the shoe or its connections. M is a spring foot-latch, operating in connection with ratchet-teeth on the inside of segment L, to retain the latter in any position in which it may be set. N is a rack, hinged at its lower end to a rigid projection from the shoe-brace J, and passing upward through a slotted plate, *n*, in the draft-frame, against the front of which the said rack is pressed with the foot when it is desired to hold down the heel of the finger-bar. At other times the rack is kept out of gear by a spring-bar, *n′*. While the rack is in this position the segment-lever L $l^1$ will raise only the heel of the finger-bar, the point resting on the ground; but by pressing the rack N forward with the foot the heel of the finger-bar may be held down at any desired point, and the segment-lever will then act to raise the point, the rack N acting as a fixed point or fulcrum, on which the finger-bar turns.

O is the driver's seat. P is the tongue. Q is a perforated bracket, extending laterally from the tongue for the attachment of the double-tree R in any desired position to counteract the side draft of the cutting apparatus.

The angle between the main frame A and draft-frame A′ is adjusted by means of a perforated standard, S, extending upward from the front of the former, and supporting it at any height by a pin, *s*, inserted through the said bar into the tongue. By this means the connecting-rod may be adjusted to work in line with the cutter, at any height of the latter. A stop-pin (represented by a dotted circle in Fig. 1) projects upward from the shoe I, immediately beneath the connecting-rod *g*, for the purpose of supporting the cutter when turned up to a vertical position.

When it is desired to convey the machine from place to place without using the cutting mechanism, the pin *s* is first withdrawn, and the segment-lever L $l^1$ and foot-rack N employed to raise the finger-bar nearly to a vertical position. The rack N is then withdrawn, and the continued motion of the lever causes the rod K to engage beneath the frame A, and draws the latter closely up against the frame A′, where it is held by means of the foot-latch M. When the finger-bar is thus raised to a vertical position the cutter-bar slips through its guides until it rests upon the pin in the shoe previously referred to. The finger-bar is inclined over the frame and there supported by means of a bar, U, hinged to the main frame at *u* for this purpose.

What is claimed as the invention of the said EPHRAIM F. and JOSIAH HERRINGTON is—

1. A shoe-brace which is rigidly attached to the finger-bar, and which extends backward between the drive-wheels on a line parallel, or nearly parallel, with the side of the main frame, and is hinged at its rear end to said frame.

2. Connecting the finger-bar to the shoe-brace, which is hinged at its rear end to the main frame in such manner as to allow said finger-bar to rise and fall at each end independently of the other, to conform to the surface of the ground over which it is drawn.

3. The lateral brace-rod, in combination with the shoe-brace, substantially as and for the purpose set forth.

4. The combination, in a forward-cut machine, of a hinged cutting apparatus with the main frame, in such manner that both ends of said cutting apparatus, each end independently of the other, may be raised by the attendant on the machine by the operation of a single lever.

5. The combination of a lifting mechanism with the hinged cutting apparatus, in such manner that said cutting apparatus may be raised or turned up into a vertical, or nearly vertical, position, for passing obstructions, by the operation of a single lever by the driver on his seat on the machine.

6. A lifting-lever provided with an internal segment-rack, for the purpose specified.

7. A lifting-lever provided with a segment-rack, in combination with a foot-latch, for holding said lever, as desired.

8. The combination of a lifting-lever with a hinged cutting apparatus, which can be turned up by the side of the machine, and a foot-latch for holding said lever when the cutting apparatus is raised.

9. The foot rack or bar, or its equivalent, operating upon the heel end of the cutting apparatus, to hold said end while the point of the cutting apparatus is being turned up, as set forth.

10. The combination of the foot-rack and the segment-lever, or their equivalents, for the purpose specified.

11. The employment of a spring for holding the foot-rack out of gear or lock, when not in use, to allow the cutting apparatus to follow the surface of the ground over which it is drawn.

12. The arrangement of pinions on the opposite ends of the counter-shaft, in combination with a mechanism for simultaneously throwing said pinions into or out of gear.

13. The employment of the pivoted levers $d^3$ $d^3$, forked at one end, and operating in the manner and for the purpose specified.

14. The employment of the wedge $d^5$, for the purpose specified.

15. The double horizontal hinged connection between the heel of the cutter-bar and the connecting-rod.

16. The reversible wedge, or its equivalent, for changing the angle of presentation of the cutters to the ground.

17. The combination, in a harvesting-machine, of the following elements, viz: a main frame, an independent seat and tongue-frame, and a hinged cutting apparatus, which is free at each end, independently of the other end and of the main frame, to follow the surface of the ground over which it is drawn.

CHARLES C. MORE.

Witnesses:
A. B. SLOCUM,
WM. PARKS.